Oct. 15, 1946.    W. A. TOLSON ET AL    2,409,456
RADIANT ENERGY LOCATING SYSTEM
Filed Jan. 29, 1944    2 Sheets-Sheet 1
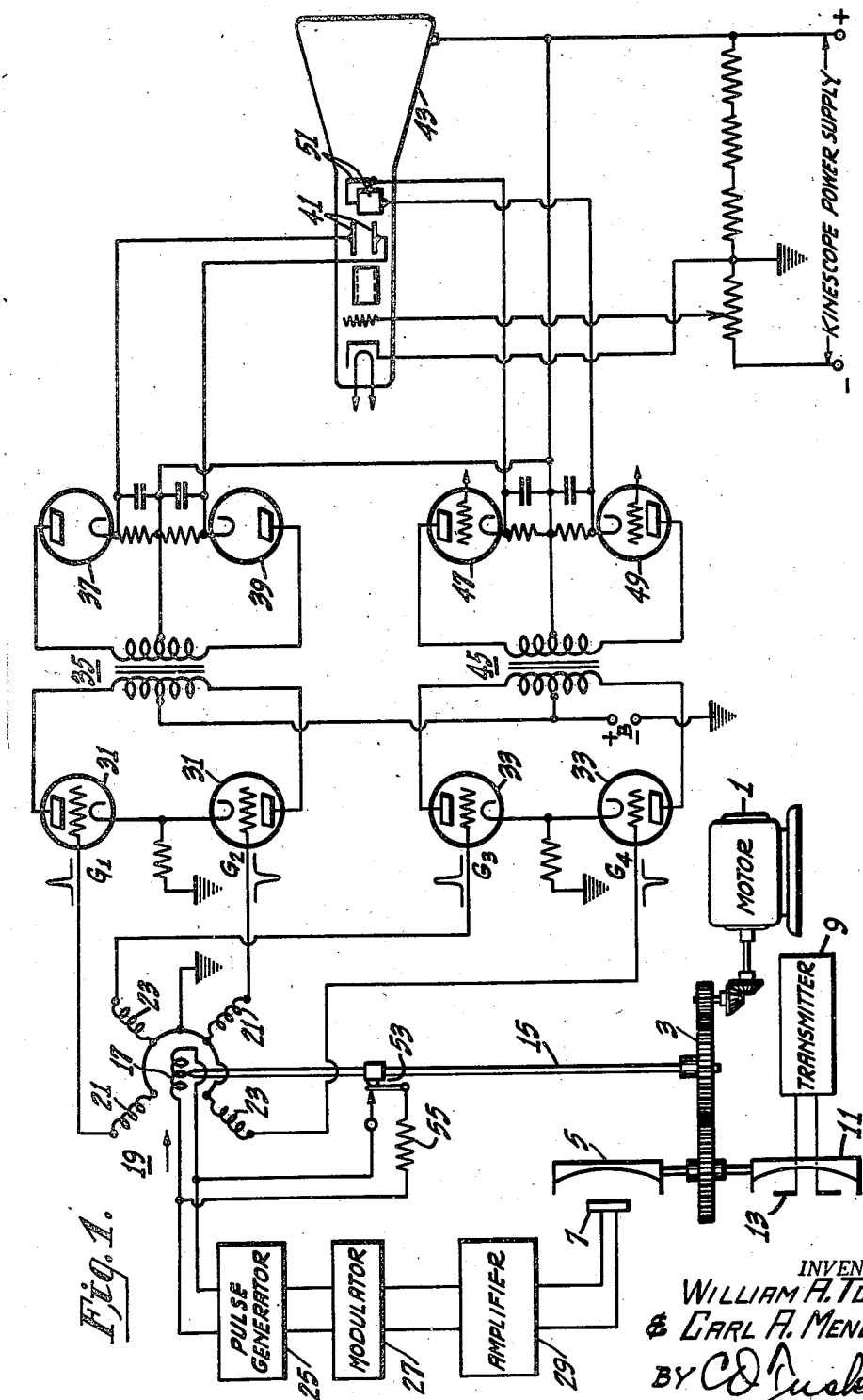

Oct. 15, 1946.  W. A. TOLSON ET AL  2,409,456
RADIANT ENERGY LOCATING SYSTEM
Filed Jan. 29, 1944  2 Sheets-Sheet 2
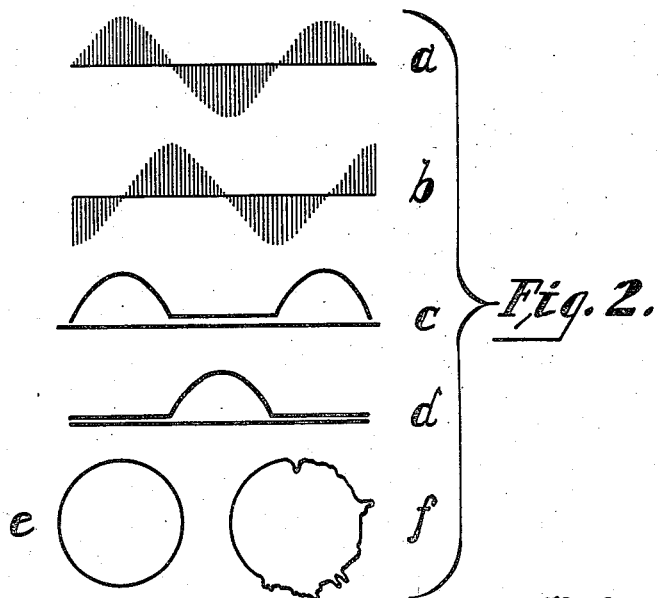
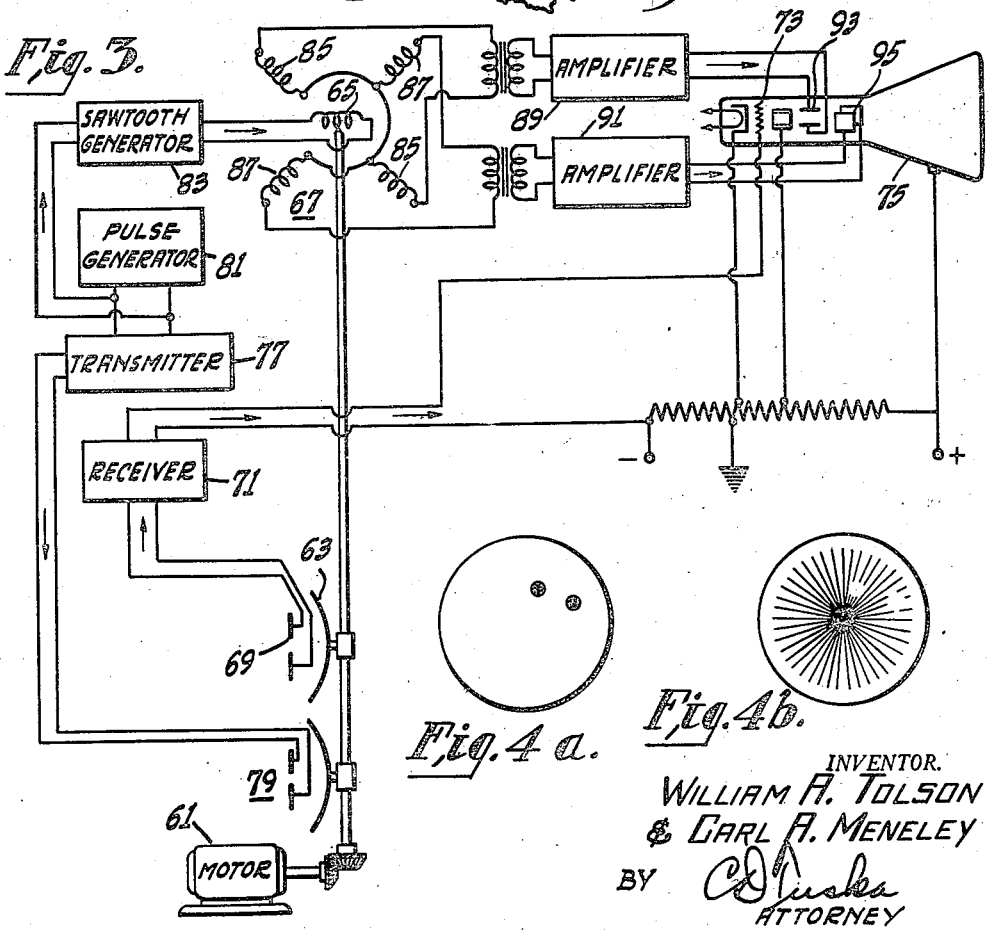
INVENTOR.
WILLIAM A. TOLSON
& CARL A. MENELEY
BY
ATTORNEY Patented Oct. 15, 1946

2,409,456

UNITED STATES PATENT OFFICE 2,409,456

RADIANT ENERGY LOCATING SYSTEM

William A. Tolson and Carl A. Meneley, Princeton, N. J., assignors to Radio Corporation of America, a corporation of Delaware Application January 29, 1944, Serial No. 520,336

14 Claims. (Cl. 250—11)

This invention relates to radiant energy locating systems and more particularly to systems for locating objects radiating or reradiating radiant energy.

Numerous systems and devices for locating the azimuthal position as well as the distance of objects reflecting radiant energy have been described. Some of these systems employ radio frequency waves, whereas others use infra red or heat waves. Moreover, in the case of both types of waves, objects may be located by radiating a beam of energy which is reflected by the object to be located and is applied after reception to a suitable indicator. Some of the systems are arranged to locate the object to be detected with respect to the complete azimuth, whereas other devices scan in a more restricted arc and indicate the position of the object within the predetermined angular range.

In such prior art systems, it has been customary to include generators which are operated in synchronism with the rotation of the directive beam whereby the generator voltage may be applied to the deflecting elements of a cathode ray tube so that the ray may be deflected in synchronism with the rotation of the directive beam of radiant energy. The inclusion of generators increases the complication of the apparatus as well as its weight.

One of the objects of the present invention is to provide improved means for synchronising the electron beam deflection in a cathode ray tube indicator of the type used in locating radiant energy sources. Another object is to provide improved means for deflecting synchronously a cathode ray and for maintaining the phase relation of said deflection with relation to radiant energy scanning beams or the like. An additional object is to provide an improved radiant energy locating system. A still further object is to provide an improved method of and means for detecting the angular position of a source of heat energy.

The invention will be described by referring to the accompanying drawings in which Figure 1 is a schematic circuit diagram of one embodiment of the invention; Figures 2a through 2f are graphs illustrating the operation of the devices of Figure 1; Figure 3 is a schematic diagram of another embodiment of the invention; and Figures 4a and 4b are graphs of the cathode ray indications obtained with the device illustrated in Figure 3.

Referring to Figure 1, a motor 1, through suitable gearing 3, is used to rotate a reflector 5 and a radiant energy responsive device 7 which is suitably located at the focus of the reflector. A transmitting device may be included on the shaft which drives the reflector 5 so that a directive beam of radiant energy may be rotated with the reflector 5, thereby to direct a beam of radiant energy toward the device to be detected or to scan the area to be protected. The transmitter may include a source of radiant energy 9, a reflector 11 and a suitable radiator 13. It should be understood that the transmitter may radiate waves of any desired frequency, for example, the radiant energy may be in the form of heat waves or radio frequency waves.

The motor 1 is also arranged to rotate a shaft 15 which is connected to the movable coil 17 of a goniometer 19. The goniometer includes fixed coils 21, 23. The shaft 15 is preferably rotated at the same angular rate as the reflector 5. The rotatable coil 17 of the goniometer is connected to a pulse generator 25 which establishes either sharply defined wave forms or sawtooth wave forms, as hereinafter described. The pulse generator is connected to a modulator 27. The modulator is controlled by the output of an amplifier 29, whose input includes the radiant energy receiving means 7. In the case of heat waves the receiver converts the applied energy into electrical energy; in the case of radio frequency waves, an antenna is used to establish the electrical currents. The heat receiver may be of the type disclosed in U. S. Patent 2,234,328 which issued on March 11, 1941, on an application filed by Irving Wolff on September 24, 1937. The heat receiver is preferably equipped with a diaphragm including a slit through which the heat waves are applied.

One terminal of each of the fixed goniometer coils 21, 23 is connected to ground. The remaining terminals of one pair of fixed coils 21 are connected to the grids G1, G2 of a first pair of push-pull tubes 31, which are connected in push-pull relation. The remaining terminals of the other pair of fixed coils 23 are connected to the grids G3, G4 of a second pair of push-pull amplifier tubes 33. The output of the first pair of tubes 31 is applied through a transformer 35 to a pair of rectifiers 37, 39 and hence to the vertical deflecting elements 41 of a cathode ray tube or kinescope 43. The output of the second push-pull tubes 33 is applied through a transformer 45 to a pair of rectifiers 47, 49, and hence to the horizontal deflecting elements 51 of the cathode ray tube 43. The remaining electrodes of the cathode ray tube are connected to a suitable power source which is not shown.

The mode of operation of the thus described system depends in part upon whether the system is used for detecting radiant energy which originates within the objects to be detected as distinguished from reflected energy. If such original energy sources are to be indicated, the transmission means, 9, 11, 13 may be omitted. On the other hand, the transmission means may be used to radiate energy which will be reflected by the objects to be indicated. In either event first assume that no radiant energy is being applied to the receiver. If the pulse generator is operated at a relatively high frequency compared to the angular rotation of the receiving reflector 5, a series of pulses, such as shown in Figure 2a, will be applied to the grids G1, and a corresponding series of pulses, as shown in Figure 2b, will be applied to the grid G3. The phase of the envelope of voltages applied to G1 and G3 differ by 90°, as is indicated in the graphs.

It should be understood that voltages corresponding to those illustrated in Figures 2a and 2b are also applied to the grids G2 and G4 so that the phase of the voltage on G1 and G2 differs by 180°, and the phase of the voltage applied to G3 and G4 also differs by 180°. The amplified currents applied to the transformers 35 and 45 are rectified so that the envelopes, as shown in Figures 2c and 2d are applied to the vertical deflecting elements 41. Corresponding voltages displaced 90° from that of Figure 2c and 90° from that illustrated in Figure 2d are applied to the horizontal deflecting elements 51. The effect of the applied voltages is to deflect the cathode ray beam throughout a circular path, as illustrated in Figure 2e.

In the absence of modulation, the cathode ray will continue to move in a circular path in synchronism with the rotation of the receiving field pattern. The presence of reflected energy will cause the receiver 7 to establish an electrical signal which may be amplified or applied directly to the modulator 27. The modulation may be used to increase the amplitude of the pulse generator output, whereby the deflecting potentials applied to the elements 41, 51 will be increased. The increased deflecting potentials will increase the radius of the cathode ray deflection to indicate the reception of radiant energy, as shown in Figure 2f. A suitable scale, which is not shown, may be disposed about the periphery of a cathode ray tube to indicate the azimuthal position at which the radiant energy is received. A zero or reference mark may be applied to any predetermined position by momentarily decreasing the amplitude of the pulses from the pulse generator 25. The decreased amplitude may be effected by cam operated switch 53, which is used to connect momentarily a resistance 55 across the output of the pulse generator. It should be understood that the ray deflection may be increased or decreased by the received signals according to the polarity of the signal currents applied to the modulator.

A modification of the invention is shown in Figure 3. In this modification the deflecting potentials are derived by applying currents of sawtooth wave form to the rotating coil of the goniometer. The sawtooth deflecting waves are either applied directly or are amplified and then applied to the deflecting elements of the cathode ray tube whereby synchronized radial deflections of the cathode ray are obtained through the desired angular range. The received signal potentials are used to control the intensity of the cathode ray so that the resultant indications on the screen of the cathode ray tube correspond to the distance and to the angular position of the radiant energy reflecting object.

In the device of Figure 3, a motor 61 is used to rotate a reflector 63 and the rotatable coil 65 of a goniometer 67. A suitable antenna 69 is arranged at the focus of the reflector, and is connected to a receiver 71. The receiver output is applied to the control electrode 73 of a cathode ray tube 75. The antenna may be connected through appropriate lengths of transmission line to a transmitter 77 or a separate directive or non-directive antenna 79 may be used for radiating the energy to be reflected. The transmitter is keyed by a pulse generator 81, which is also connected to a sawtooth wave generator 83. The sawtooth waves are applied to the rotatable coil of the goniometer. The fixed coils 85, 87 of the goniometer are connected directly or through amplifiers 89, 91 to the deflecting elements 93, 95 respectively of the cathode ray tube.

The mode of operation of Figure 3 is as follows: At the instant the transmitter 77 is keyed by the pulse generator 81, a pulse of radiant energy is radiated and a sawtooth wave is applied through the goniometer 67 and amplifiers 89, 91 to the deflecting elements 93, 95. The cathode ray, which may be either biased off or applied to the cathode ray tube screen, is deflected radially at an angular position which may be made to correspond to the angular position of the beam of transmitted or received radiant energy. If an object reflects the energy, the reflected signal will be received at a later interval of time in accordance with well known theory. The received reflected signal, which is applied to the control element of the cathode ray tube, depending on signal polarity, will either key on the ray to indicate the reception as a bright spot on the screen, or the signal will key off the ray to indicate the reception as a dark spot on the radial trace as illustrated in Figures 4a and 4b, respectively. The distance of the spot along the radial trace corresponds to the distance of the object and the radial position of the trace corresponds to the azimuthal position of the object.

Thus, the invention has been described as an improved radiant energy locating system in which the deflecting voltages for a cathode ray tube indicator are derived by applying pulse energy to the rotatable coil of a goniometer. The wave form of the deflecting voltages may be sawtooth or rectilinear. If rectilinear pulses are employed, they are rectified and the rectified currents supplied to deflect the cathode ray in a circular path corresponding to the area to be scanned by the radiant energy. The term "radiant energy" is used throughout the specification and claims to include either heat energy, radio frequency energy or any desired form of wave energy transmission. While it is preferable to employ directive transmission and directive reception, the desired directivity may be obtained from the transmitted radiation or from the received signals. In the case of heat waves, no transmitter is required if the objects to be detected are at a temperature which is different from the ambient.

We claim as our invention:

1. A radiant energy locating system including in combination means for receiving radiant energy, rotatable means for limiting the reception of said radiant energy to a predetermined angular range, a cathode ray tube for indicating the angular position at which said energy is received, said tube including elements for deflecting said ray throughout said range, a goniometer having a rotatable coil movable in synchronism with said rotatable means and having fixed coils disposed in operative relation to said rotatable coil, a generator connected to said rotatable coil for inducing energy in quadrature phase in said fixed coils, and connecting means between said fixed coils and said deflecting elements for applying potentials to said deflecting elements for rotating said ray in synchronism with said rotatable means and for deflecting said ray in a radial direction.

2. A radiant energy locating system including in combination rotatable means for selectively receiving radiant energy throughout a predetermined angular range, a cathode ray tube for indicating the angular position at which said energy is received, said tube including elements for deflecting said ray throughout said range, a goniometer having a rotatable coil movable in synchronism with said rotatable means and having fixed coils disposed in operative relation to said rotatable coil, a sawtooth generator connected to said rotatable coil for inducing energy in quadrature phase in said fixed coils, and means effectively connected to said fixed coils and to said deflecting elements for applying potentials to said deflecting elements for rotating said ray in synchronism with said rotatable means and for radially deflecting said ray in synchronism with said sawtooth energy.

3. A radiant energy locating system including in combination rotatable means for receiving radiant energy throughout a predetermined angular range, a cathode ray tube for indicating the angular position at which said energy is received, said tube including elements for deflecting said ray throughout said range, a goniometer having a rotatable coil movable in synchronism with said rotatable means and having fixed coils disposed in operative relation to said rotatable coil, a pulse generator connected to said rotatable coil for inducing pulses in quadrature phase in said fixed coils, means effectively connected to said fixed coils and to said deflecting elements for applying potentials to said deflecting elements for deflecting said ray in synchronism with said rotatable means, and means for applying modifying potentials to said cathode ray tube to indicate reception of said radiant energy.

4. A radiant energy locating system including in combination rotatable means for selectively receiving radiant energy throughout a predetermined angular range, a cathode ray tube for indicating the angular position at which said energy is received, said tube including elements for deflecting said ray throughout said range, a goniometer having a rotatable coil movable in synchronism with said rotatable means and having fixed coils disposed in operative relation to said rotatable coil, a pulse generator connected to said rotatable coil for inducing pulses in quadrature phase in said fixed coils, rectifier means effectively connected to said fixed coils and to said deflecting elements for applying potentials to said deflecting elements for deflecting said ray in synchronism with said rotatable means, and means for applying modifying potentials to said cathode ray tube to indicate reception of said radiant energy.

5. A system of the character of claim 1 including a modulator connected to said generator and to said receiving means for varying said generator output in response to received radiant energy.

6. A radiant energy locating system including in combination rotatable means for receiving radiant energy throughout a predetermined angular range, a cathode ray tube for indicating the angular position at which said energy is received, said tube including elements for deflecting said ray throughout said range, a goniometer having a rotatable coil movable in synchronism with said rotatable means and having fixed coils disposed in operative relation to said rotatable coil, a generator connected to said rotatable coil for inducing energy in quadrature phase in said fixed coils, means connecting said fixed coils and said deflecting elements for applying potentials corresponding to said energy to said deflecting elements for deflecting said ray in synchronism with said rotatable means and for deflecting said ray in a radial direction, and means for applying said received radiant energy to said cathode ray tube whereby the ray is varied and reception of said radiant energy is indicated.

7. A radiant energy locating system including in combination rotatable means for selectively receiving radiant energy throughout a predetermined angular range, a cathode ray tube for indicating the angular position at which said energy is received, said tube including elements for deflecting said ray throughout said range, a goniometer having a rotatable coil movable in synchronism with said rotatable means and having fixed coils disposed in operative relation to said rotatable coil, a generator connected to said rotatable coil for inducing energy in quadrature phase in said fixed coils, rectifier means effectively connecting said fixed coils and said deflecting elements for applying potentials corresponding to said energy to said deflecting elements for deflecting said ray in synchronism with said rotatable means, and means for applying said received radiant energy to said cathode ray tube whereby the ray is varied and reception of said radiant energy is indicated.

8. A radiant energy locating system including in combination rotatable means for receiving radiant energy throughout a predetermined angular range, a cathode ray tube for indicating the angular position at which said energy is received, said tube including elements for deflecting said ray throughout said range, a goniometer having a rotatable coil movable in synchronism with said rotatable means and having fixed coils disposed in operative relation to said rotatable coil, a generator connected to said rotatable coil for inducing energy in quadrature phase in said fixed coils, amplifying means connected to said fixed coils, rectifying means connected to the output of said amplifying means and to said deflecting elements for applying deflecting potentials to rotate said ray in synchronism with said rotatable means, and means for applying said received radiant energy to said cathode ray tube to indicate the angular range at which said radiant energy is received.

9. A radiant energy locating system including in combination rotatable means for receiving radiant energy throughout a predetermined angular range, a cathode ray tube for indicating the angular position at which said energy is received, said tube including elements for deflecting said ray throughout said range and an element for controlling said ray, a goniometer having a rotatable coil movable in synchronism with said rotatable means and having fixed coils disposed in operative relation to said rotatable coil, a generator connected to said rotatable coil for inducing energy in quadrature phase in said fixed coils, means connecting said fixed coils and said deflecting elements for applying potentials to said deflecting elements for deflecting said ray in synchronism with said rotatable means and for deflecting said ray in a radial direction, and means for applying said received radiant energy to said controlling element whereby reception of said radiant energy may be indicated.

10. A radiant energy locating system including in combination means for receiving radiant energy, rotatable means for limiting the reception of said radiant energy to a predetermined angular range, a cathode ray tube for indicating the angular position at which said energy is received, said tube including elements for deflecting said ray throughout said range and a control element for modifying said ray, a goniometer having a rotatable coil movable in synchronism with said rotatable means and having fixed coils disposed in operative relation to said rotatable coil, a generator connected to said rotatable coil for inducing energy in quadrature phase in said fixed coils, means connecting said fixed coils and to said deflecting elements for applying potentials to said deflecting elements for deflecting said ray in synchronism with said rotatable means and for directing said ray in a radial direction, and means for applying said received radiant energy to said cathode ray tube control element whereby said ray may be modified to indicate reception of said radiant energy.

11. A radiant energy locating system including in combination a heat responsive receiver, rotatable means for limiting the response of said receiver to a predetermined angular range, a cathode ray tube for indicating the angular position at which said heat is received, said tube including elements for deflecting said ray throughout said range, a goniometer having a rotatable coil movable in synchronism with said rotatable means and having fixed coils effectively connected to said deflecting elements, a pulse generator connected to said rotatable coil for inducing pulses in said fixed coils, and means connected to said pulse generator and to said heat responsive receiver for modulating said pulses in accordance with said received heat whereby said pulses in the absence of modulation deflect said ray in synchronism with said rotating means, and whereby in the presence of modulation said ray deflection is altered to indicate reception of said heat.

12. A radiant energy locating system including in combination a receiver responsive to radio energy, rotatable means for limiting the response of said receiver to a predetermined angular range, a cathode ray tube for indicating the angular position at which said radio energy is received, said tube including elements for deflecting said ray throughout said range, a goniometer having a rotatable coil movable in synchronism with said rotatable means and having fixed coils effectively connected to said deflecting elements, a pulse generator connected to said rotatable coil for inducing pulses in said fixed coils, and means connected to said pulse generator and to said receiver for modulating said pulses in accordance with said received radio energy whereby said pulses in the absence of modulation deflect said ray in synchronism with said rotating means, and whereby in the presence of modulation said ray deflection is altered to indicate reception of said radio energy.

13. A radiant energy locating system including in combination rotatable means for receiving radiant energy throughout a predetermined angular range, a cathode ray tube for indicating the angular position at which said energy is received, said tube including elements for deflecting said ray throughout said range, a goniometer having a rotatable coil movable in synchronism with said rotatable means and having fixed coils operatively coupled to said rotatable coil, a pulse generator connected to said rotatable coil for inducing pulses in said fixed coils, amplifiers connected to said fixed coils, rectifiers connected to said deflecting elements, and means connected to said pulse generator and to said rotatable means for modifying said pulses in accordance with said received energy whereby said pulses in the absence of modulation deflect said ray in synchronism with said rotating means, and whereby in the presence of modulation said ray deflection is altered to indicate reception of said radiant energy.

14. A radiant energy locating system including in combination rotatable means for receiving radiant energy throughout an azimuthal range, a cathode ray tube for indicating the azimuthal position at which said energy is received, said tube including elements for deflecting said ray throughout said range, a goniometer having a rotatable coil movable in synchronism with said rotatable means and having fixed coils effectively connected to said deflecting elements, a pulse generator connected to said rotatable coil for inducing pulses in said fixed coils, and means connected to said pulse generator and to said rotatable means for modifying said pulses in accordance with said received energy whereby said pulses in the absence of modulation deflect said ray in synchronism with said rotating means, and whereby in the presence of modulation said ray deflection is altered to indicate reception of said radiant energy.

WILLIAM A. TOLSON.
CARL A. MENELEY.